(12) United States Patent
Alrabadi et al.

(10) Patent No.: US 8,874,047 B2
(45) Date of Patent: Oct. 28, 2014

(54) AGILE AND ADAPTIVE TRANSMITTER-RECEIVER ISOLATION

(75) Inventors: Osama Nafeth Alrabadi, Aalborg (DK); Mikael Bergholz Knudsen, Gistrup (DK); Gert F. Pedersen, Storvorde (DK); Alexandru Daniel Tatomirescu, Aalborg (DK); Mauro Pelosi, Aalborg (DK); Samantha Caporal Del Barrio, Aalborg (DK); Poul Olesen, Stovring (DK); Peter Bundgaard, Aalborg (DK)

(73) Assignee: Intel Mobile Communications GmbH, Neubiberg (DE)

( * ) Notice: Subject to any disclaimer, the term of this patent is extended or adjusted under 35 U.S.C. 154(b) by 200 days.

(21) Appl. No.: 13/423,613

(22) Filed: Mar. 19, 2012

(65) Prior Publication Data

US 2013/0244593 A1  Sep. 19, 2013

(51) Int. Cl.
*H04B 1/44* (2006.01)

(52) U.S. Cl.
USPC ............ 455/78; 455/73; 455/101; 455/276.1; 455/67.16; 455/66.1; 343/702; 343/700 MS (58) Field of Classification Search
USPC ........ 455/73, 101, 33, 66.1, 67.16, 276.1, 78; 343/702, 700 MS
See application file for complete search history.

(56) References Cited

U.S. PATENT DOCUMENTS

| | | | | |
|---|---|---|---|---|
| 5,566,209 | A | * | 10/1996 | Forssen et al. ................. 375/262 |
| 5,812,088 | A | * | 9/1998 | Pi et al. .......................... 342/373 |
| 6,081,233 | A | | 6/2000 | Johannisson |
| 6,115,409 | A | * | 9/2000 | Upadhyay et al. ............ 375/144 |
| 7,069,053 | B2 | * | 6/2006 | Johannisson et al. ....... 455/562.1 |
| 7,260,141 | B2 | | 8/2007 | Bierly et al. |
| 7,657,243 | B2 | * | 2/2010 | Yoon et al. .................. 455/276.1 |
| 7,817,967 | B2 | * | 10/2010 | Karabinis et al. ............. 455/101 |
| 7,835,455 | B2 | * | 11/2010 | Shattil ............................ 375/260 |
| 8,233,554 | B2 | * | 7/2012 | Karabinis ....................... 375/260 |
| 8,233,846 | B2 | * | 7/2012 | Rofougaran .................... 455/73 |
| 8,238,318 | B1 | | 8/2012 | Negus |
| 8,259,830 | B1 | * | 9/2012 | McCloskey et al. .......... 375/260 |
| 8,412,126 | B2 | * | 4/2013 | Karabinis et al. ............. 455/101 |
| 8,423,028 | B2 | * | 4/2013 | Kenington et al. ........... 455/445 |
| 8,433,242 | B2 | * | 4/2013 | Kenington et al. ............. 455/25 |
| 8,604,989 | B1 | * | 12/2013 | Olsen ........................... 343/754 |
| 2007/0189362 | A1 | * | 8/2007 | D'Amico et al. ............. 375/148 |
| 2007/0201575 | A1 | | 8/2007 | Ariyavisitakul et al. |
| 2009/0191876 | A1 | | 7/2009 | Jain et al. |
| 2010/0045553 | A1 | | 2/2010 | Ohira et al. |

OTHER PUBLICATIONS

Barry D. Van Veen, et al., "Beamforming: A Versatile Approach to Spatial Filtering", IEEE ASSP Magazine, Apr. 1988, p. 4-24.

(Continued)

*Primary Examiner* — Marceau Milord
(74) *Attorney, Agent, or Firm* — Eschweiler & Associates, LLC (57) ABSTRACT

The disclosed invention relates to a transceiver system having one or more receive antennas that receive a first radio frequency (RF) signal and a plurality of transmit antennas that wirelessly transmit a second RF signal. A local channel determination unit provides data corresponding to the environment of local communication channels (i.e., the communication channels between the transmit antennas and the receive antennas) to a beamforming element, which enables beamforming functionality within the transmit and/or receive antennas (e.g., by using analog or digital weights to vary the radiation pattern generated by the transmit antennas) so as to attenuate RF signals extending between the transmit antennas and the receive antennas. By attenuating signals extending between the transmit and the receive antennas, a high degree of isolation is achieved between transmission and reception paths.

19 Claims, 8 Drawing Sheets

(56) References Cited

OTHER PUBLICATIONS

M. Pelosi, et al., "A Novel Paradigm for High Isolation in Multiple Antenna Systems with User's Influence", European Conference on Antennas and Propagation 2010, Apr. 12-16, 2010, Barcelona, p. 1-5.

Mauro Pelosi, et al., "Multiple Antenna Systems with Inherently Decoupled Radiators", IEEE Transactions on Antennas and Propagation, vol. 60, No. 2, Feb. 2012, p. 503-515.
Non-Final Office Action dated Dec. 19, 2013 for U.S. Appl. No. 13/598,683.
Notice of Allowance Apr. 16, 2014 U.S. Appl. No. 13/598,683.

* cited by examiner

AGILE AND ADAPTIVE TRANSMITTER-RECEIVER ISOLATION

BACKGROUND

Many modern wireless communication devices (e.g., cell phones, wireless sensors, PDAs, RFID readers, etc.) utilize transceivers having both a transmitter section configured to transmit data and a receiver section configured to receive data over radio frequencies.

Figure 1:
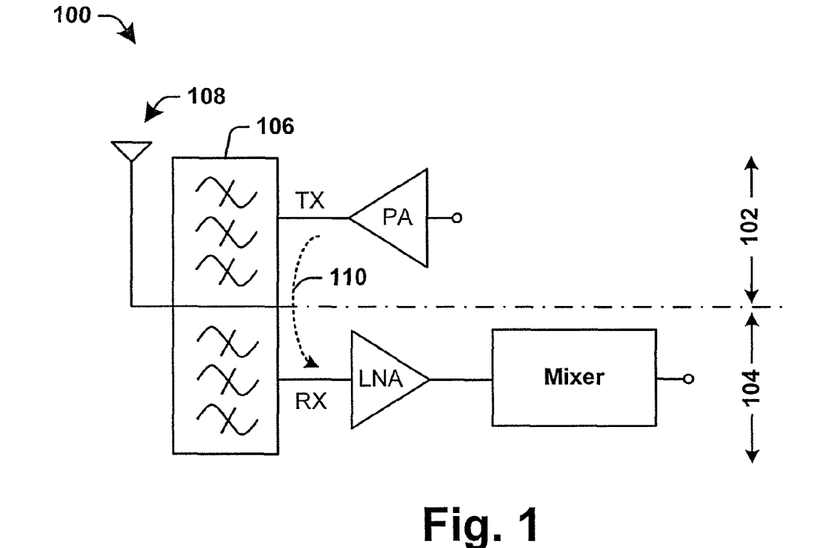
FIG. 1 illustrates a block diagram of a transceiver system with intermodulation distortion in the reception path.

For example, FIG. 1 illustrates a wireless communication transceiver 100 comprising a transmission path 102 and a reception path 104. To achieve high data rates, transceiver 100 may be configured to operate in full-duplex mode, wherein both transmission path 102 and reception path 104 operate at the same time. During full-duplex mode operation, transmission path 102 typically uses one carrier frequency while reception path 104 uses another carrier frequency (e.g., an adjacent frequency band). In order to provide isolation between transmission path 102 and reception path 104, a duplexer 106 may couple both transmission path 102 and reception path 104 to a common antenna 108.

Despite using different frequencies, intermodulation distortion may arise during operation of transceiver 100. One of the most common sources of intermodulation distortion occurs when a transmitted signal 110 leaks into reception path 104 due to limited isolation between transmission path 102 and reception path 104. Once intermodulation distortion appears within reception path 104, there is no way of distinguishing it from the desired signal and transceiver sensitivity is degraded.

BRIEF DESCRIPTION OF THE DRAWINGS

FIG. 5b illustrates a graph showing a frequency response of the transceiver system shown in FIG. 5a.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

RF intermodulation distortion typically occurs when a transmitted signal from a transmission path leaks into a reception path due to limited isolation between the transmission and reception paths. Isolation between the paths may be achieved by connecting the transmission path and reception paths to a common antenna by way of a duplexer. However, because duplexers are not tunable, modern day multi-band transceivers must utilize a dedicated duplexer for each band. The use of multiple duplexers is bulky, expensive, and consumes a large amount of power. Alternatively, separate narrowband antennas can be used for reception and transmission of signals. However, since narrowband antennas are lossy and may not provide high isolation, isolation between the separate antennas is limited to an amount that is practically below what is needed to prevent intermodulation distortion.

Figure 2:
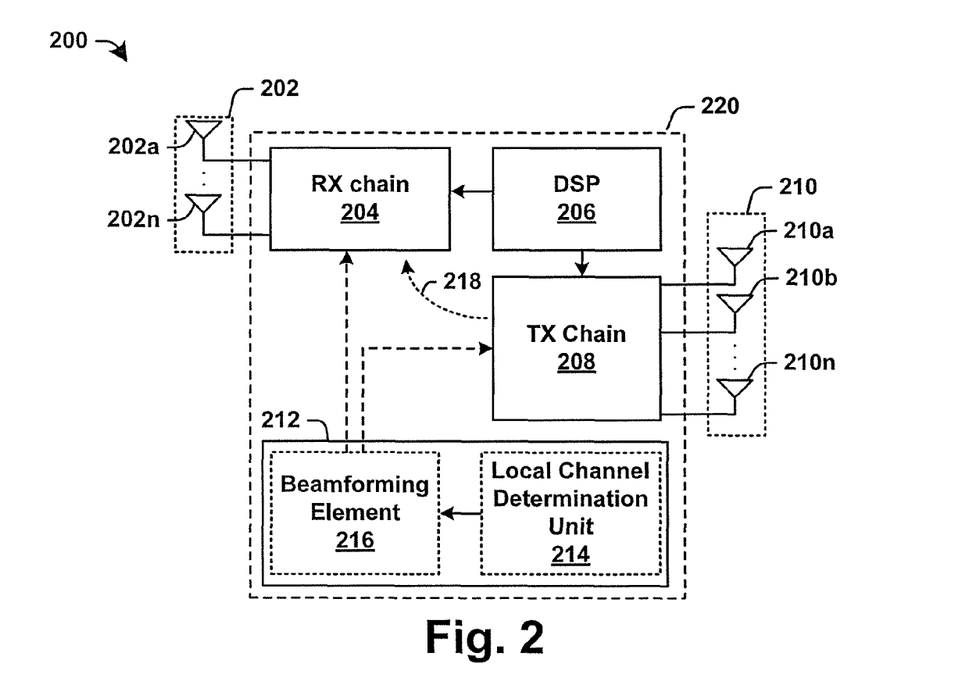
FIG. 2 illustrates an exemplary block diagram of a transceiver system configured to provide a high degree of transmitter-receiver isolation by attenuating local transmitted and/or received signals.

Accordingly, a transceiver system is disclosed herein that utilizes a spatial filter to achieve a high degree of isolation between reception and transmission paths. In some embodiments, the transceiver system comprises separate receiver and transmitter antenna arrays. The receiver antenna array comprises one or more receive antennas configured to receive a first radio frequency (RF) signal. The transmitter antenna array comprises a plurality of transmit antennas configured to wirelessly transmit a second RF signal. A local channel determination unit is configured to provide data corresponding to the environment of local communication channels (i.e., the communication channels between the transmit antennas and the receive antennas) to a beamforming element, which enables beamforming functionality within the transmit and/or receive antennas (e.g., by using analog or digital weights to vary the radiation pattern generated by the transmit antennas) so as to attenuate RF signals extending between the transmit antennas and the receive antennas. By attenuating signals extending between the transmit and receive antennas, a high degree of isolation is achieved between transmission and reception paths FIG. 2 illustrates an exemplary block diagram of a transceiver system 200 configured to provide a high degree of transmitter-receiver isolation by attenuating transmitted and/or received signals.

The transceiver system 200 comprises a mobile communication device 220 having a reception path and a transmission path. The reception path comprises a receive antenna array 202 comprising one or more receive antennas 202a-202n configured to receive a first RF signal (a received signal). The received signal is provided to a reception chain 204 configured to demodulate and down-convert the received signal. The down-converted, demodulated signal is provided to a digital signal processor (DSP) 206. The transmission path comprises transmission chain 208 configured to modulate data received from the DSP 206 onto a carrier wave and then to up-convert the modulated data from a baseband frequency to a radio frequency (RF), thereby generating a second RF signal. The second RF signal is provided to a transmit antenna array 210 comprising a plurality of transmit antennas 210a-210n, which are configured to wirelessly transmit the second RF signal (a transmitted signal).

A spatial filter element 212 is configured to operate the transmit and/or receive antennas in a manner that attenuates RF signals directed between local antennas comprised within the same mobile communication device 220 (i.e., signals transmitted from a transmit antenna array 210 and received by a receiver antenna array 202). In particular, the spatial filter element 212 operates the transmit/receive antennas in a manner that attenuates transmitted/received RF signals over a null angle that is in the direction of the receive/transmit antennas. By attenuating RF signals directed between local antennas a high degree of isolation is achieved between the transmission path and the reception path.

For example, in some embodiments, the spatial filter element 212 is configured to operate the plurality transmit antennas 210a-210n in a manner that attenuates transmitted signals over a null angle that is in the direction of the local receive antennas 202a-202n (i.e., to attenuate signals transmitted to receive antennas comprised within the same mobile communication device 220 as transmit antennas 210a-210n) without attenuating the transmitted signals over other angles. In other embodiments, the spatial filter element 212 is configured to operate the plurality of receive antennas 202a-202n in a manner that attenuates received signals over a null angle that is in the direction of a local transmit antennas 210a-210n (i.e., to attenuate signals received from transmit antennas comprised within the same mobile communication device 220 as receive antennas 202a-202n) without attenuating the received signals over other angles. By attenuating transmitted signals in the direction of the receive antennas 202a-202n or received signals in the direction of the transmit antennas 210a-210n, a high degree of isolation is achieved between transmission and reception paths.

In some embodiments, the spatial filter element 212 comprises a local channel determination unit 214 and a beamforming element 216. The local channel determination unit 214 is configured to determine an environment of local communication channels 218 extending between the transmission path and the reception path. In other words, the local channel determination unit 214 determines an effect of transmitted signals on a receive antenna 202. In some embodiments, the local channel determination unit 214 may comprise a memory element configured to store data (e.g., programmed by the DSP) corresponding to a static environment of local communication channels 218. In other embodiments, the local channel determination unit 214 may be configured to actively monitor the environment of local communication channels between the transmission path and the reception path. For example, in some embodiments, the local channel determination unit 214 is configured to actively measure local communication channels 218 within the transceiver system 200 (e.g., using one or more sensors). In other embodiments, the local channel determination unit 214 is configured to detect an amount of a transmitted signal that has leaked into the reception path.

The local channel determination unit 214 provides data corresponding to an environment of local communication channels 218 to the beamforming element 216. The beamforming element 216 is configured to enable beamforming functionality within the transmit antenna array 210 and/or the receive antenna array 202 by applying antenna weights to the transmit and/or receive antennas. For example, the beamforming element 216 enables beamforming functionality for transmitted signals by weighing the transmit antennas 210a-210n with transmit antenna weights in a manner that causes the transmit antennas 210a-210n to attenuate the transmitted signal in the direction of the receive antenna 202.

The beamforming element 216 may weigh the receive antennas 202a-202n with analog complex weights to achieve a response of the received signal that has a reduced amplitude (e.g., a null) in the direction of the transmit antennas 210a-210n. For example, the beamforming element 216 can apply analog weights to the receive antennas 202a-202n by way of phase-shifters, and then combine the phase shifted signals before the received signal moves to a downstream LNA. By determining the receive antenna weights based upon the local communication channel environments, the amplitude of a received signal can be reduce over one or more null angles in the direction of local transmit antennas.

Similarly, the beamforming element 216 may weigh the transmit antennas 210a-210n with digital baseband complex weights (i.e., introducing transmit antenna weights in the baseband section of the transmission path) or analog complex weights (e.g., using variable vector modulators in the RF section of the transmission path) to achieve a response of the transmitted signal that has a reduced amplitude (e.g., a null) in the direction of the receive antennas 202a-202n.

For example, in some embodiments, the beamforming element 216 weighs transmit antennas 210a-210n by introducing a phase and/or amplitude shift into a transmitted signal provided to each of the transmit antennas 210a-210n. Concurrently providing transmitted signals with specific phases and/or amplitudes to the plurality of transmit antennas 210a-210n causes the transmitted signals to be superimposed upon one another to constructively interfere in some locations and to destructively interfere in other locations. By determining the transmit antenna weights based upon the local communication channel environments, the interference can be set to result in a transmitted signal that is output according to a specific radiation pattern having a reduced amplitude over one or more null angles in the direction of local receive antennas.

Since the disclosed spatial filter element 212 is configured to provide for isolation by attenuating the transmitted/received signal in the direction of the receive antennas 202a-202n/transmit antennas 210a-210n, a high degree of isolation can be achieved even if the frequencies of the receive antennas 202a-202n and transmit antennas 210a-210n overlap one another. Therefore, in some embodiments, the receive antennas 202a-202n and the transmit antennas 210a-210n may comprise wideband antennas.

In some embodiments, the beamforming element 216 is configured to dynamically vary the antenna weights. By dynamically varying the antenna weights (e.g., the phases and/or amplitudes of the transmitted signals) changes in the local communication channels 218 can be accounted for and/or the direction and/or size of a null angle can be adjusted. For example, if the phases of the RF signal transmitted from antennas 210a-210n are the same, the resulting transmitted signal will have a first null angle, while if the phases of the RF signal transmitted from antennas 210a-210n are different, the resulting transmitted signal may be steered to have a second null angle.

It will be appreciated that the proposed method and apparatus are not limited to providing isolation between a transmission path and reception path in an FDD mode of operation. Rather the proposed method and apparatus can provide isolation in many different situations. For example, the proposed method and apparatus can provide isolation between a transmission path that belongs to a first wireless communication standard (e.g., WiFi TX) and a reception path that belongs to another second wireless communication standard (e.g., a Bluetooth Rx) when both the transmission path and reception path are collocated in a same handset.

To enhance the readers understanding of the disclosed methods and apparatus, FIGS. 3a-5 are described in regards to operating transmit antennas in a manner that attenuates a transmitted signal to form a null angle comprising one or more receive antennas. However, one of ordinary skill in the art will appreciate that the disclosed method and apparatus are not limited to such cases, but may be alternatively applied to operating receive antennas in a manner that attenuates a received signal to form a null angle comprising one or more transmit antennas.

Figure 3A:
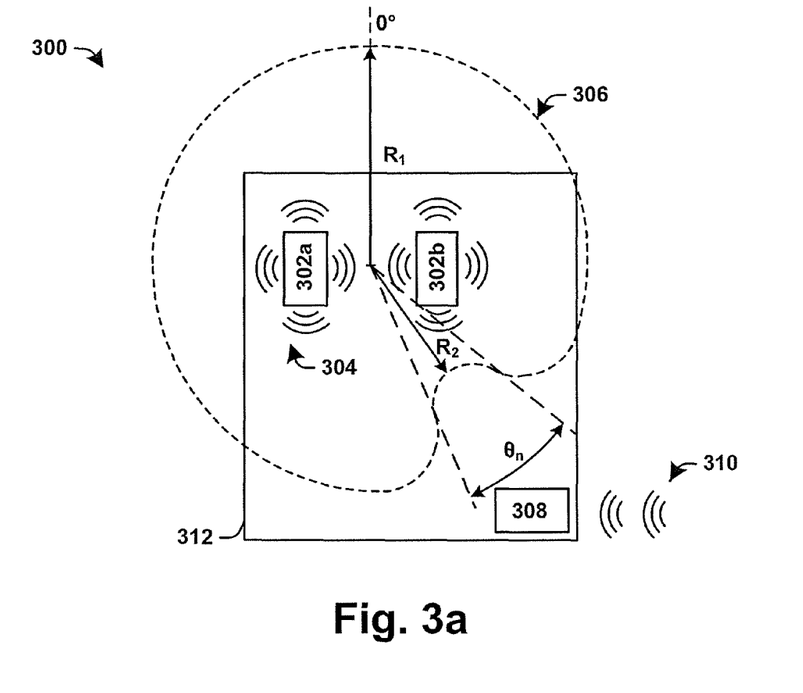
FIG. 3a illustrates an exemplary block diagram of a top view of a transceiver system having a plurality of transmit antennas configured to provide a high degree of transmitter-receiver isolation by attenuating transmitted signals directed towards one or more receive antennas.

FIG. 3a illustrates an exemplary block diagram of a top view of a transceiver system 300 having a plurality of transmit antennas configured to provide a high degree of transmitter-receiver isolation by reducing an amplitude of transmitted signals in the direction of one or more receive antennas.

The transceiver system 300 comprises a mobile communication device 312 having transmit antennas 302a-302b and a receive antenna 308. The transmit antennas 302a-302b are configured to transmit first RF signals (transmitted signals 304), while the receive antenna 308 is configured to receive second RF signals (received signals 310). The transmitted signals 304 interfere with one another to collectively form a radiation pattern 306 over which the transmitted signals 304 are transmitted. By properly weighting the transmit antennas 302a-302b with proper transmit antenna weights (e.g., baseband complex weights or analogue complex weights) the transmitted signals 304 output by the transmit antennas 302a-302b destructively interfere so as to jointly zero-force the near-field over a null angle $\theta_n$ that is in the direction of the receive antenna 308.

For example, transmitted signals 304 from transmit antennas 302a-302b constructively interfere with one another to form a radiation pattern 306 that maintains a given amplitude until a radius $R_1$, which extends from a center point of the transmit antennas 302a-302b. However, along the null angle $\theta_n$ the transmitted signals 304 destructively interfere with one another to from a radiation pattern 306 that maintains the given amplitude until a radius $R_2$ that is less than the radius $R_1$.

Figure 3B:
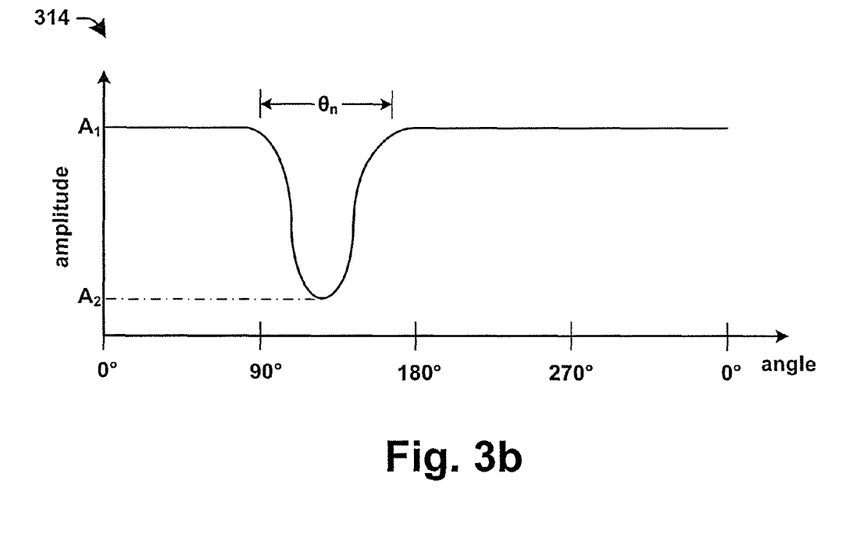
FIG. 3b is a graph showing a transmitted signal amplitude as a function of angle.

In other words, the power of the transmitted signals 304 are reduced over the null angle $\theta_n$ relative to the power of the transmitted signals 304 in other directions. For example, FIG. 3b is a graph 314 showing a transmitted signal amplitude as a function of angle, at a radius $R_1$. As shown in graph 314, the amplitude of the transmitted signal is reduced along the null angle $\theta_n$ with respect to the amplitude of the transmitted signal at other angles. Because the strength of the radiation pattern is reduced along the direction of the null angle $\theta_n$, a high degree of isolation between the transmit antennas and receive antennas is achieved.

While a mobile communication device 312 having two transmit antennas 302a and 302b can be operated to achieve a single null angle $\theta_n$, it will be appreciated that as the number of transmit antennas present within a transceiver system increases the number of null angles that can be achieved also increases. Therefore, in some embodiments, the number of transmit antennas is greater (e.g., by at least one) than the number of receive antennas, so that the transmit antennas can generate a null angles for receive antennas located at discrete angles.

Figure 3C:
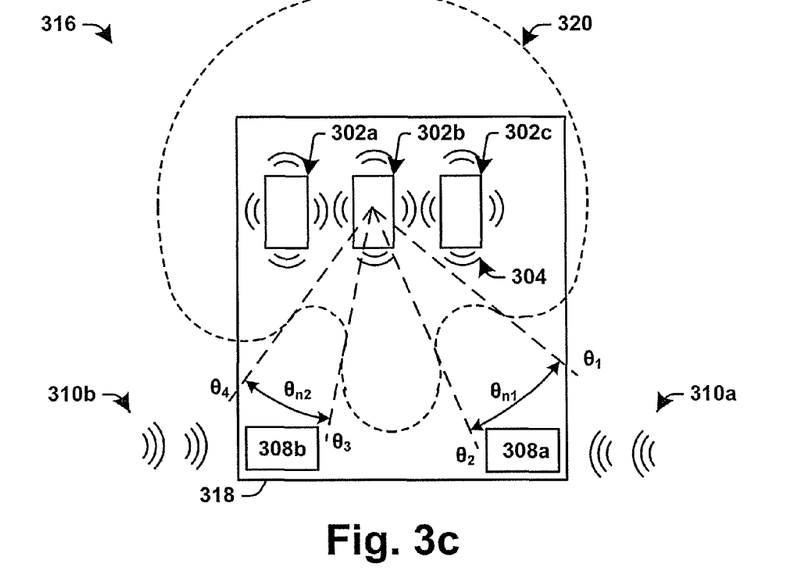
FIG. 3c illustrates an exemplary block diagram of a top view of a transceiver system having a plurality of transmit antennas configured to reduce an amplitude of transmitted signals along separate null angles.

For example, FIG. 3c illustrates an exemplary block diagram of a top view of a transceiver system 316 having a plurality of transmit antennas 302a-302c configured to reduce an amplitude of transmitted signals along separate null angles $\theta_{n1}$-$\theta_{n2}$. In particular, the transceiver system 316 comprises a mobile communication device 318 having three transmit antennas 302a-302c and two receive antennas 308a-308b. The three transmit antennas 302a-302c allow the mobile communication device 318 to be operated to generate a radiation pattern 320 having a first null angle $\theta_{n1}$ extending from $\theta_1$ to $\theta_2$ and a second null angle $\theta_{n2}$ extending from $\theta_3$ to $\theta_4$. The different null angles $\theta_{n1}$ and $\theta_{n2}$ reduce an amplitude of transmitted signals in the directions of two receive antennas, 308a and 308b, which are located at discrete angles.

Figure 4:
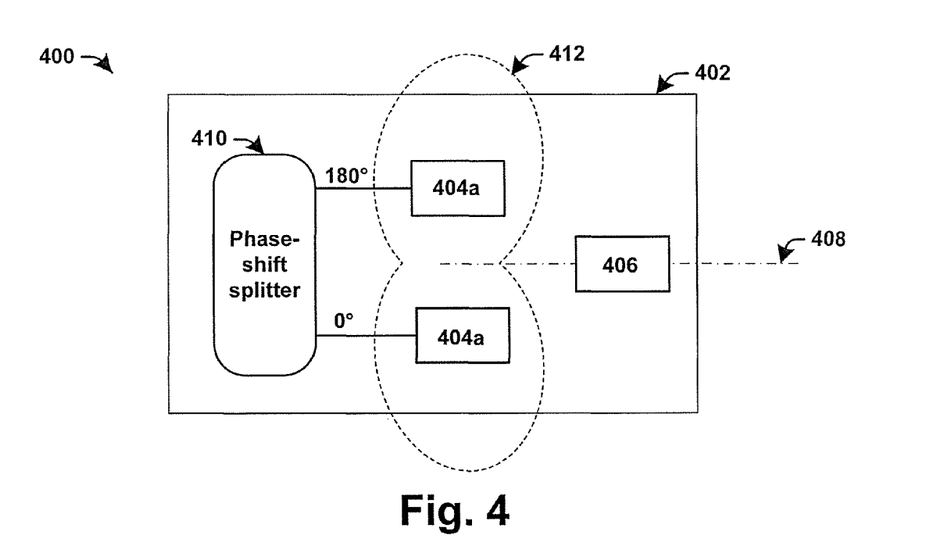
FIG. 4 illustrates a top view of a transceiver system having a symmetric transmit antenna topology configured to attenuate transmitted signals towards one or more receive antennas
Figure 5A:
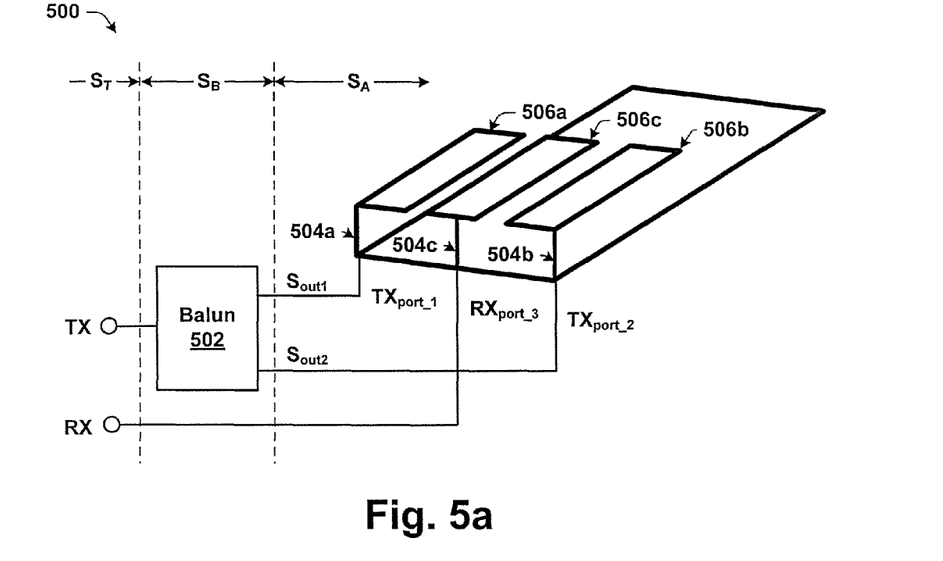
FIG. 5a illustrates a three dimensional embodiment of a transceiver system having a symmetric transceiver array topology implemented using PIFA antennas.
Figure 5B:
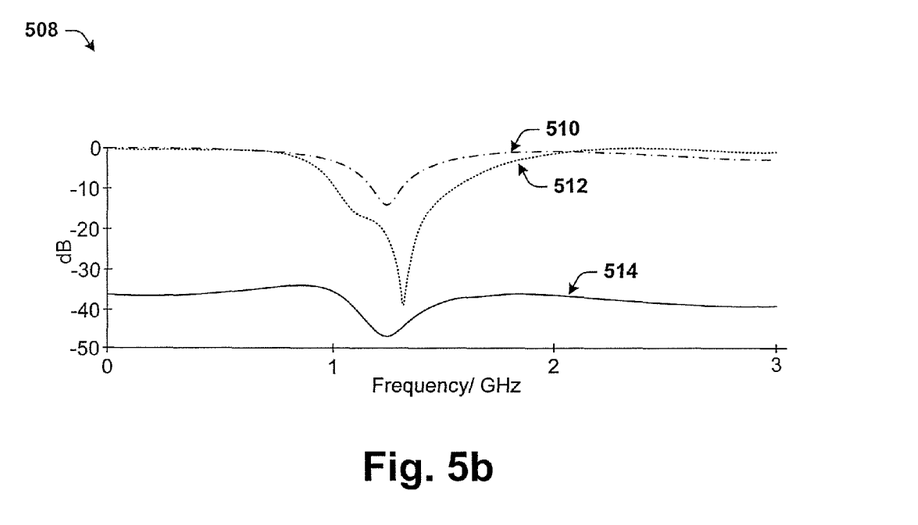

FIGS. 4 and 5a-5b illustrate a specific embodiment of a transceiver system having transmit antennas configured to attenuate transmitted signals towards a receive antennas. The transceiver system comprises an environment where there is no or limited user interaction with the wireless device, allowing for the transmit antenna weights to be constant (e.g., to be programmed by the DSP or designed once using fixed phase-shifts and fixed gains). It will be appreciated that the transceiver system in FIGS. 4 and 5a-5b is not limited to the number of transmit and receive antennas shown.

FIG. 4 illustrates a top view of a more detailed example of a transceiver system 400 having a transmit antenna array configured to attenuate transmitted signals towards one or more receive antennas.

The transceiver system 400 comprises a mobile communication device 402 comprising a first transmit antenna 404a and a second transmit antenna 404b configured to radially transmit an RF signal. A receive antenna 406 is located along an axis of symmetry 408 of first and second transmit antennas 404a and 404b. In alternative embodiments, more than one receive antenna can be located along the axis of symmetric and receive similar strong isolation levels.

A phase-shift splitter 410 is configured to provide a first signal to first transmit antenna 404a and a second signal to second transmit antenna 404b. The first and second signals are equal but antipodal versions of the same signal. For example, the first signal may be 180° phase-shifted version of the second signal. In some embodiments, the phase-shift splitter 410 may comprise a balun configured to receive single ended signal and to output differential signals having a 180° phase shift therebetween. In various other embodiments, the phase-shift splitter may comprise a power divider together with a 180° phase-shifter or other circuitry that provides a similar functionality. By providing transmit antennas 404a and 404b with antipodal version of the same signal the local communication channels output from the transmit antennas 404a, 404b form a transmitted signal having a null vector along the axis of symmetry 408, which corresponds to the location of the receive antenna 406.

FIG. 5a illustrates an embodiment of a disclosed transceiver system 500 implemented using a three port antenna array comprising PIFA antennas. Transceiver system 500 is a non-limiting embodiment of a disclosed transceiver system, and one of ordinary skill in the art will appreciate that the transmit and receive antennas may comprise various types of antennas. In some embodiments, the transmit and receive antennas may comprise planar inverted-F wideband antennas (PIFA) and/or multiple-input/multiple-output (MIMO) wideband antennas. In some embodiment, the transmit antennas may comprise MIMO wideband antennas and the receive antenna may comprise a wideband PIFA, for example.

Transceiver system 500 comprises a transmit channel TX and a receive channel RX. The transmit channel TX is connected to a first antenna port $TX_{port\_1}$ and a third antenna port $TX_{port\_3}$ by way of a balun 502. The balun 502 is configured to receive a signal to be transmitted from the transmit channel TX and to generate first and second output signals, $S_{out1}$ and $S_{out2}$, having a phase-shift therebetween. The first and second output signals, $S_{out1}$ and $S_{out2}$, are provided to the first antenna port $TX_{port\_1}$ and the third antenna port $TX_{port\_3}$, respectively. In some embodiments, the first output signal $S_{out1}$ may have a 180° phase shift with respect to the second output signal $S_{out2}$. The receive channel RX is connected to a second antenna port $RX_{port\_2}$.

The antenna ports are connected to three PIFA antennas 506a-506c by way of antenna feeds 504a-504c. In particular, the first and third antenna ports $TX_{port\_1}$, $TX_{port\_3}$ are connected to the first and third PIFA antennas 506a and 506c, while the second antenna port $RX_{port\_2}$ is connected to the second PIFA antenna 506b. The first and third PIFA antennas 506a and 506c are configured to operate as transmit antennas, while the second PIFA antenna 506b is configured to operate as a receive antenna located in a symmetric topology with respect to the two transmit antennas 506a and 506c.

The symmetric topology of the PIFA antennas allows for out of phase transmit signals to be provided to transmit antennas 506a and 506c in a manner that forms a transmitted signal having a reduced amplitude at receive antenna 506b. For example, in some embodiments the first and third antenna ports, $TX_{port1}$ and $TX_{port3}$, can be driven with a 180° out-of-phase signal by using baseband DSP weights of [0.707-0.707] to enable beamforming. In such an example, strong isolation is achieved between the transmit antennas 506a, 506c and the receive antenna 506b due to the deep null in the near-fields.

FIG. 5b illustrates a graph 508 showing a frequency response of the antenna array shown in FIG. 5a.

In particular, graph 508 shows signal responses for a reception path 510, a transmission path 512, and an isolation 514 between the transmission and reception paths at 1.3 GHz. The non-zero response of the reception path 510 and the transmission path 512 show that the transmission and reception paths are operating properly (i.e., receiving and radiating at 1.3 GHz), while the isolation 514 shows that there is isolation between them. Accordingly, the operational bandwidth of the reception paths 510 and transmission path 512 are not traded for isolation.

The results shown in graph 508 can be illustrated mathematically by defining a scattering matrix $S_A$ corresponding to the transmit and receive channels (See, FIG. 5a) and a matrix $S_B$, which represents the power division and phase shift operation.

$$S_A = \begin{bmatrix} S_{11} & S_{12} & S_{12} \\ S_{12} & S_{22} & S_{23} \\ S_{12} & S_{23} & S_{22} \end{bmatrix}$$

$$S_B = \begin{bmatrix} 1 & 0 \\ 0 & 1/\sqrt{2} \\ 0 & -1/\sqrt{2} \end{bmatrix}.$$

Cascading $S_A$ with $S_B$ results in a coupling free 2×2 matrix $S_T$, $$S_T = S_B^T S_A S_B$$
$$= \begin{bmatrix} S_{11} & 0 \\ 0 & S_{22} - S_{23} \end{bmatrix},$$

wherein the zeros along the diagonals indicate an isolation between the reception path and the transmission path.

It will be appreciated that in practice integrated antennas are sensitive to external use cases where there is user interaction with the wireless device (e.g., whether a hand is positioned on the phone, the position of a hand on the phone, etc.). Such external use cases alter the impedance of the integrated antenna, thereby altering the local communication channels between transmission and reception paths. Therefore, in environments having external influences, transmit antenna weights may vary in time to account for dynamic local communication channels.

Figure 6A:
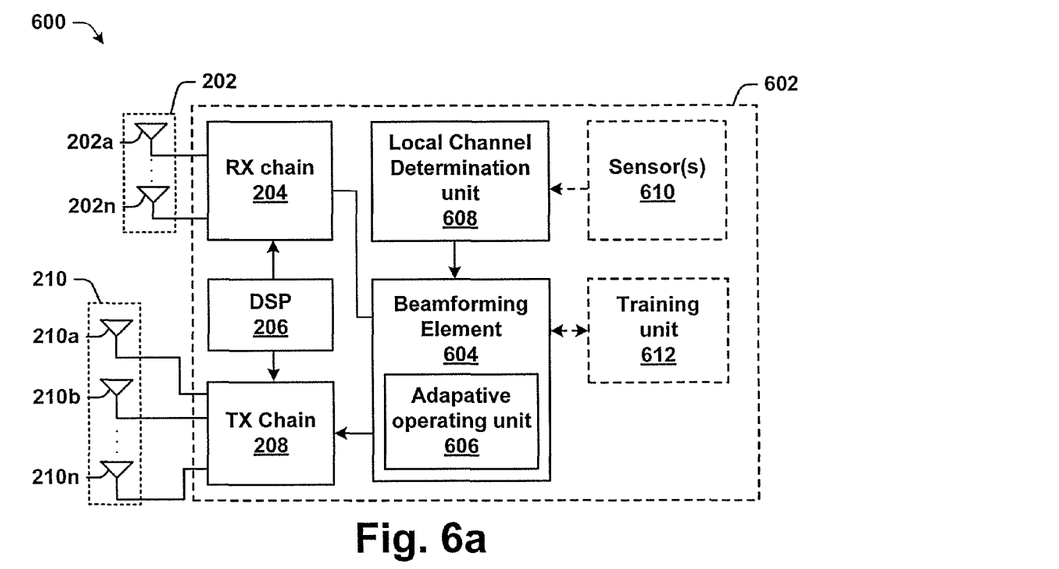
FIG. 6a illustrates a block diagram of a transceiver system configured to dynamically adapt transmit antenna weights.

FIG. 6a illustrates a disclosed transceiver system 600 configured to dynamically adapt antenna weights to account for changes in local communication channels between a reception path and a transmission path.

Transceiver system 600 comprises a mobile communication device 602 having a beamforming element 604 configured to apply transmit antenna weights to RF signals provided to different transmit antennas 210 and/or receive antenna weights to RF signals received at different receive antennas 202. The beamforming element 604 comprises an adaptive operating unit 606 configured to vary the transmit antenna weights that are applied by the beamforming element 604 in real time. In some embodiments weighting of the antennas is performed periodically according to the coherence time of the local communication channels. For example, if there is no or limited user proximity effect, the isolation can be made once at the design stage (e.g., as in wireless sensor transceivers), but if the local communication channels are time-varying due to user interaction and other proximity effects, vary the transmit antenna weights is performed periodically.

By dynamically adjusting the antenna weights, the adaptive operating unit 606 can account for changes in the local communication channels (e.g., due to external use cases) or to steer the null angle of transmitted and/or received signals. For example, at a first time period a first transmit antenna 210a outputs a signal having an amplitude $A_{1,1}$ and a phase $\theta_{1,1}$ and a second transmit antenna 210b outputs a signal having an amplitude of $A_{2,1}$ and a phase $\theta_{2,1}$, resulting in a transmitted signal having a null angle $\phi_1$. At a second time period a change in external use cases causes the local communication channels to change. By adjusting the first transmit antenna 210a to output a signal having an amplitude $A_{1,2}$ and a phase $\theta_{1,2}$ and the second transmit antenna 210b to output a signal having an amplitude $A_{3,2}$ and a phase $\theta_{3,2}$ the null angle $\phi_1$ can remain the same despite changes in the local communication channels.

It will be appreciated that changes to the receive antenna weights can be implemented by the beamforming element 604 in analog (e.g., by phase shifters), while changes to the transmit antenna weights can be implemented by the beamforming element 604 either digitally or in analog. In some embodiments, changes in the transmit antenna weights can be implemented in analog by using vector modulators in an RF stage of the transmit chain 208. The vector modulators are configured to vary the amplitude and/or phase of the RF signal provided to transmit antennas 210a-210n. In other embodiments, changes in the transmit antenna weights can be implemented in digital by using an algorithm (e.g., zero forcing algorithm, SVD algorithm) that gives an excitation of transmit antennas 210a-210n that generates a null in the direction of a receive antenna 202. For example, the adaptive operating unit 606 may use a zero forcing algorithm to invert a measured local communication channel to achieve a null in the direction of a receive antenna 202.

In yet other embodiments, changes in the transmit antenna weights can be implemented through parasitic antennas attached to tunable reactive loads. For example, in some embodiments transmit antennas 210a-210n are connected to one or more parasitic elements having a reactance value associated therewith. Feed circuits are configured to feed signals having different phases to the transmit antennas 210a-210n. By changing the reactance values associated with the parasitic elements, electrical lengths of the parasitic elements can be changed, causing the transmitted signal to change its direction.

In some embodiments, the adaptive operating unit 606 is configured to determine the transmit and/or receive antenna weights using an iterative algorithm to change transmit and/or receive antenna weights until a local channel determination unit 608 detects that a null is achieved towards a receive antenna 202 and/or a transmit antenna. For example, the adaptive operating unit 606 can use an algorithm that converges blindly without knowing the local communication channels by changing transmit antenna weights applied to transmit antennas and by detecting a power of the transmitted signal (via local channel determination unit 608) at a receive antenna, until a minimum energy of the transmitted signal is achieved.

Alternatively, the adaptive operating unit 606 can receive data about local communication channels from the local channel determination unit 608 and determine transmit and/or receive antenna weights therefrom. For example, in some embodiments, the adaptive operating unit 606 is configured to adaptively change transmit antenna weights based upon the detected changes in the local communication channels (i.e., the transmitted signals between transmit and receive antennas). In some embodiments, one or more sensors 610 located within the mobile communication device 602 are configured to measure data corresponding to the local communication channels (e.g., including changes in the local communication channels due to the presence or absence of external use cases) and to provide the data to the local channel determination unit 608.

In some embodiments, the transceiver system 600 comprises a training unit 612 configured to account for the dynamic changes in local communication channels by performing a local training sequence to determine transmit and/or receive antenna weights. In some embodiments, the training unit 612 is configured to perform a local training sequence to determine the local communication channels extending between the transmitter chain 208 and the receiver chain 204. The local communication channels are then provided to the beamforming element 604, which can invert the local communication channels to get null towards receive antenna 202.

Figure 6B:
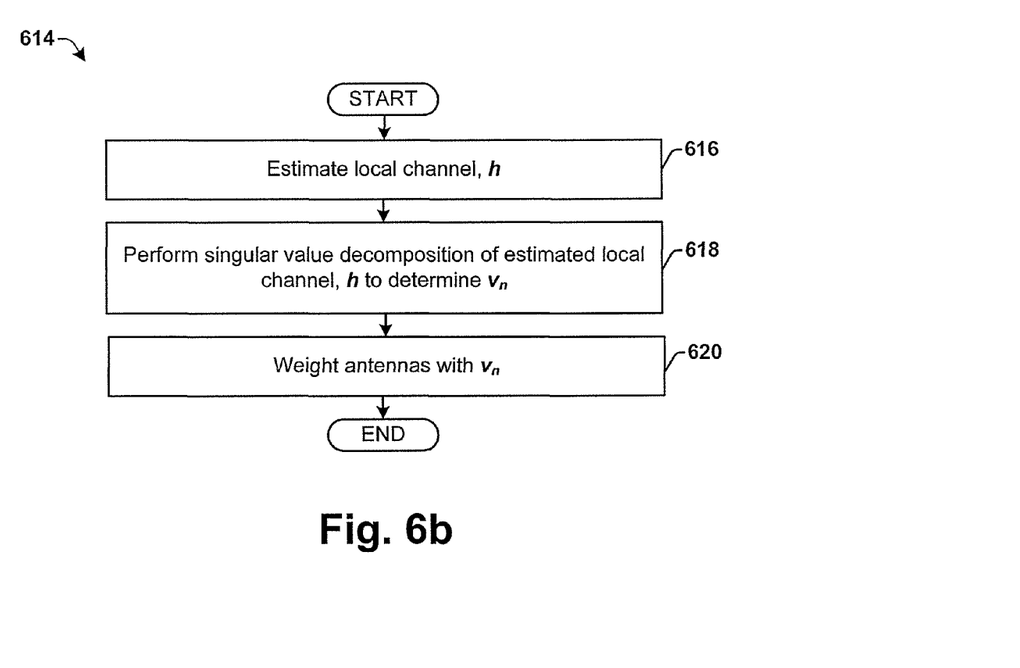
FIG. 6b is a flow diagram of an exemplary local training sequence that may be implemented to account for changes in local communication channels.

FIG. 6b illustrates a flow diagram 614 of an exemplary training sequence that may be implemented to account for the dynamic changes in the local communication channel.

It will be appreciated that while the methods disclosed herein (e.g., methods 614 and 1000) are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Furthermore, the disclosed methods may be implemented as a apparatus, or article of manufacture using standard programming and/or engineering techniques to produce software, firmware, hardware, or any combination thereof to control a computer to implement the disclosed subject matter (e.g., the circuits shown in FIG. 2, 6a, etc., are non-limiting examples of circuits that may be used to implement the disclosed methods). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

At 802 the method operates to determine an estimated channel matrix h.

At 804 a singular value decomposition of the estimated channel matrix h is taken. According to the singular value decomposition theorem, the singular value decomposition of the estimated channel matrix h gives $\Sigma V^H$ (i.e. $\zeta(h)=\Sigma V^H$), where $V=[v_s\ v_n]$ and $v_n$ is the vector that lies in the null space of h.

At 806 antennas are weighted with $v_n$ to attenuate signals directly between local receive and transmit antennas.

Figure 7:
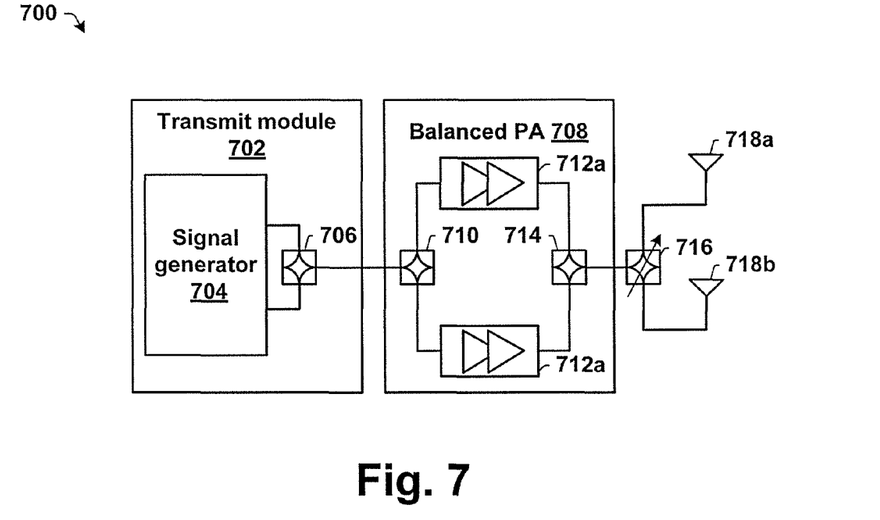
FIG. 7 illustrates an exemplary block diagram of a transmission path configured to implement analog beamforming in an array of transmit antennas.

FIG. 7 illustrates an exemplary block diagram of a transmission path 700 configured to implement analog beamforming in an RF stage of the transmission path 700.

Transmission path 700 comprise a transmit module 702 having a signal generator 704 and a first hybrid coupler 706 configured to provide a single ended signal to a balanced power amplifier 708. By outputting a single ended signal, the transmit module 702 is compatible with conventional power amplifiers which are configured to receive a single ended signal.

The balanced power amplifier 708 utilizes a first hybrid coupler 710 to split the received single ended signal into a differential signal, which is provided to first and second power amplifiers 712a, 712b. By splitting the received single ended signal into two parts, the balanced power amplifier 708 operates more efficiently (e.g., at lower power). A second hybrid coupler 714 receives the amplified differential signals and generates a single ended signal that is output from the balanced power amplifier 708 to a variable hybrid coupler 716.

The variable hybrid coupler 716 is configured to generate a first and second output signals, having a phase shift therebetween, which are provided to first and second transmit antennas 718 and 718b, respectively. The phase shift between the first and second output signals enables a beamforming functionality in the signal transmitted by first and second transmit antennas 718a and 718b, which provides for a reduction in the amplitude of the transmitted signal in the direction of local receive antennas (i.e., receive antennas within a same transceiver system).

Figure 8:
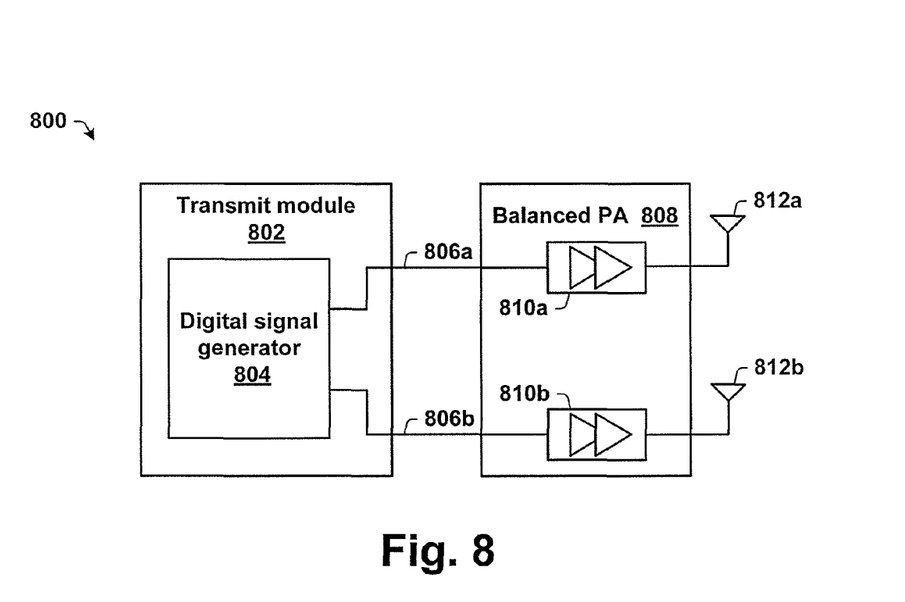
FIG. 8 illustrates an exemplary block diagram of a transmission path configured to implement digital beamforming in an array of transmit antennas.

FIG. 8 illustrates an exemplary block diagram of a transmission path 800 configured to implement digital beamforming in a baseband stage of the transmission path 800.

Transmission path 800 comprises a transmit module 802 configured to provide a differential signal to a balanced power amplifier 808 by way of a first and second differential branches, 806a and 806b. The transmit module 802 comprises a digital signal generator 804 configured to generate differential signals having a phase shift introduced into one branch relative to the other. The phase shift can be introduced in a relatively simple manner by a register shift operation, for example.

The differential signal output from the transmit module 802, containing signals to which digital weighting has been applied to achieve a transmitted signal having a null in the direction of a local receive antenna, are provided directly from the transmit module 802 to separate power amplifiers 810a and 810b, and to first and second transmit antennas 812a and 812b. By using the transmit module 802 to perform beamforming digitally, a transmitted signal having a null angle in the direction of local receive antennas (i.e., receive antennas within a same transceiver system) is generated without using a tunable balun/hybrid, resulting in a significant reduction in insertion loss and cost.

Figure 9:
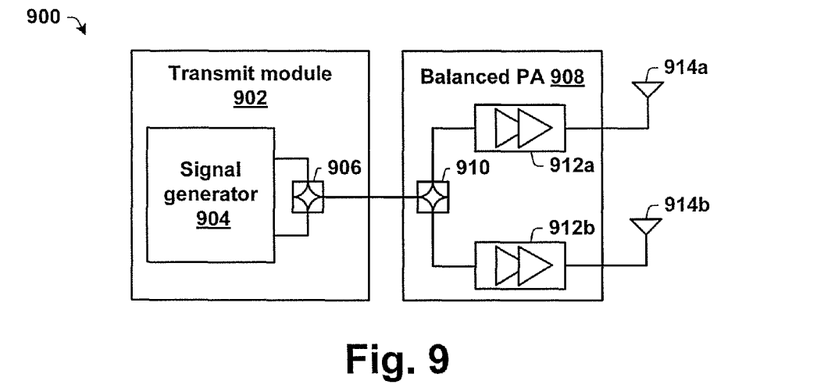
FIG. 9 illustrates an exemplary block diagram of a transmission path configured to implement analog beamforming in an array of transmit antennas.

FIG. 9 illustrates an exemplary block diagram of a transmission path 900 configured to implement analog beamforming in a baseband stage of the transmission path 900.

Transmission path 900 comprises a transmit module 902 having a signal generator 904 configured to output a differential signal to a hybrid coupler 906. Hybrid coupler 906 provides a single ended signal to a balanced power amplifier 908. By outputting a single ended signal, the transmit module 902 is compatible with conventional power amplifiers which are configured to receive a single ended signal.

The balanced power amplifier 908 utilizes a hybrid coupler 910 to split the received single ended signal into a differential signal. The differential signal is provided to a first power amplifier and a second power amplifier within the balanced power amplifier 908, and to first and second transmit antennas 914a and 914b.

In some embodiments, although analog devices are used in beamforming some elements of the transmission path may be controlled digitally. For example, in some embodiments the signal generator 904 is configured to output a differential signal to which digital weighting has already been applied. Therefore, signals that are properly weighted to achieve a transmitted signal having a null in the direction of a local receive antenna are provided from the transmit module 902 to first and second transmit antennas 914a and 914b.

In other embodiments, the first or second power amplifiers 912a and 912b are configured to selectively provide a variable phase shift, which can be used to phase shift the signal at one transmit antenna (e.g., 914a) relative to the other (e.g., 914b). By adjusting the relative phase shift of the transmitted signal between antennas it is possible to adjust the relative phase of the two versions of the transmitted signal. Moreover, it is possible to adjust the power level of each transmitted signal by use of independent power control of the two transmitted signals. By adjusting both phase and amplitude it is possible to achieve a transmitted signal having a null in the direction of a local receive antenna.

Figure 10:
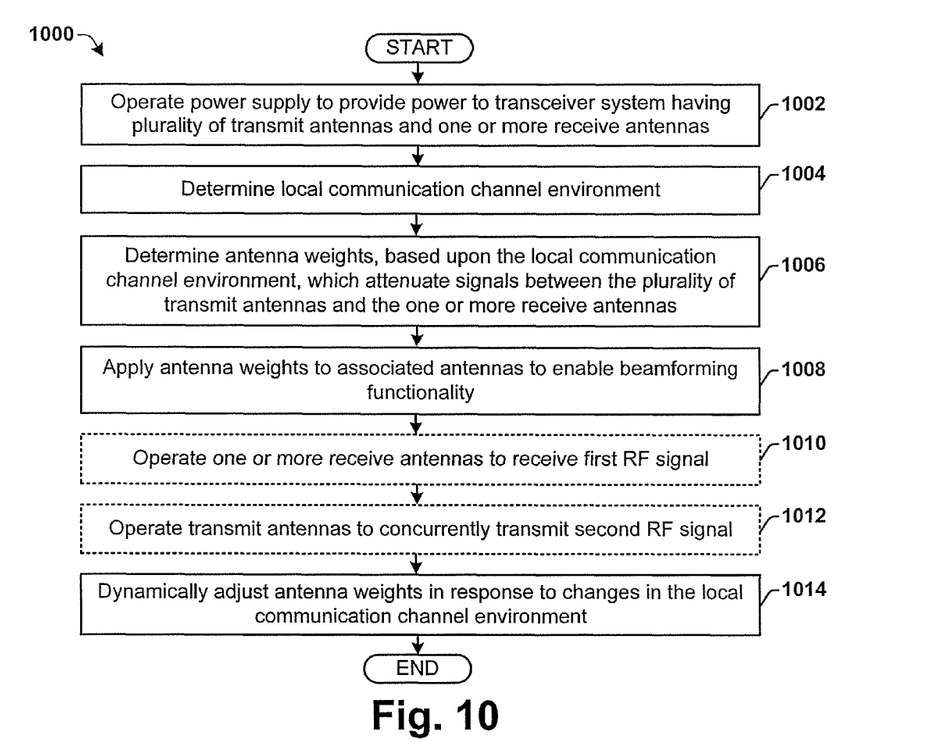
FIG. 10 is a flow diagram of an exemplary method for generating a spatial filter that provides isolation between a reception path and a transmission path.

FIG. 10 illustrates a flow diagram of a method for achieving a high degree of TX-RX isolation between a transceiver chain and a reception chain.

At 1002 the method operates a power supply to provide power to a transceiver unit having a transmission path comprising plurality of transmit antennas and a reception path comprising one or more receive antennas. In some embodiments, the number of transmit antennas is greater than the number of receive antennas.

At 1004 the method operates to determine a local communication channel environment. The local communication channel environment describes the communication channels between the plurality of transmit antennas and the one or more receive antennas.

At 1006 the method operates to determine antenna weights, based upon the local communication channel environment, which attenuate signals between the plurality of transmit antennas and the one or more receive antennas. In various embodiments, the antennas weights may comprise transmit antenna weights, which are chosen to attenuate a transmitted signal in the direction of the one or more receive antennas, or receive antenna weights, which are chosen to attenuate a received signal in the direction of the plurality of transmit antennas.

At 1008 the method operates to a antenna weights to associated antennas to enable beamforming functionality that reduces the amplitude of signals between the plurality of transmit antennas and the one or more receive antennas. In some embodiments, receive antenna weights may be applied to the one or more receive antennas to reduce the amplitude of received signals over a null angle comprising the plurality of transmit antennas without reducing the amplitude of received signals over other angles. In some embodiments, transmit antenna weights may be applied to the plurality of transmit antennas to reduce the amplitude of the transmitted signal over a null angle comprising the one or more receive antennas without reducing the amplitude of the transmitted signal over other angles.

At 1010 the method may operates the one or more receive antennas to receive a first radio frequency (RF) signal, in some embodiments.

At 1012 the method may operate the plurality of transmit antennas to transmit a second RF signal, in some embodiments. In some embodiments, the method operates plurality of transmit antennas may transmit the second RF signal concurrent with operating the one receive antennas to receive a first RF signal.

At 1014 the method operates to dynamically adjust antenna weights in response to changes in the local communication channel environment.

Figure 11:
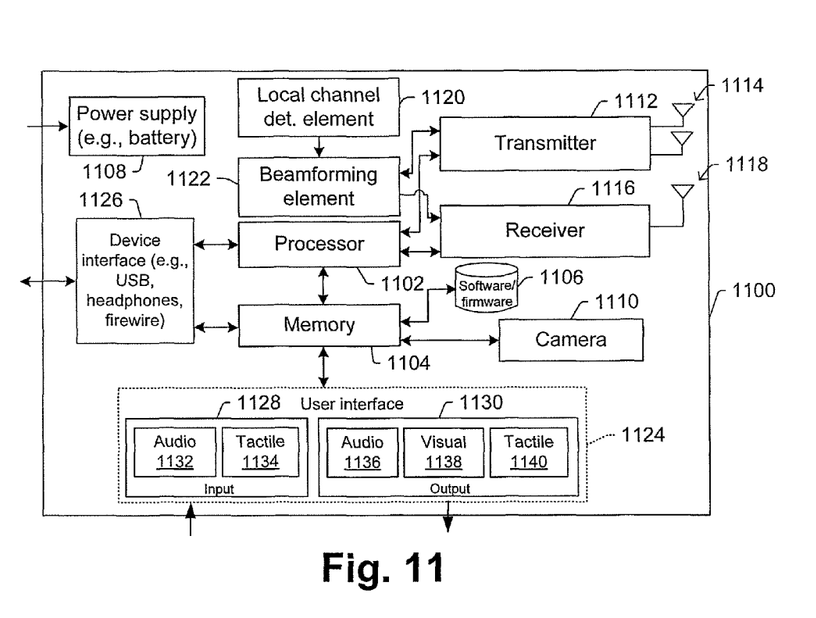
FIG. 11 illustrates an example of a mobile communication device, such as a mobile handset, in accordance with the disclosure.

FIG. 11 and the following discussion provide a brief, general description of a suitable mobile communication device 1100 to implement embodiments of one or more of the provisions set forth herein. This mobile communication device 1100 is merely one possible device on which second order intermodulation noise attenuation techniques as set forth above may be implemented, and it will be appreciated that the noise attenuation techniques may also be used with other devices (e.g., individual digital chip sets, mixed-signal chip sets, and/or analog chip sets). Therefore, the mobile communication device 1100 of FIG. 11 is only one example of a suitable operating environment and is not intended to suggest any limitation as to the scope of use or functionality of the operating environment. Example mobile communication devices include, but are not limited to, mobile devices (such as mobile phones, Personal Digital Assistants (PDAs), media players, and the like), tablets, personal computers, server computers, hand-held or laptop devices, multiprocessor systems, consumer electronics, mini computers, mainframe computers, distributed computing environments that include any of the above systems or devices, and the like.

FIG. 11 illustrates an example of a mobile communication device 1100, such as a mobile phone handset for example, configured to implement one or more embodiments provided herein. In one configuration, mobile communication device 1100 includes at least one processing unit 1102 and memory 1104. Depending on the exact configuration and type of mobile communication device, memory 1104 may be volatile (such as RAM, for example), non-volatile (such as ROM, flash memory, etc., for example) or some combination of the two. Memory 1104 may be removable and/or non-removable, and may also include, but is not limited to, magnetic storage, optical storage, and the like. In some embodiments, computer readable instructions in the form of software or firmware 1106 to implement one or more embodiments provided herein may be stored in memory 1104. Memory 1104 may also store other computer readable instructions to implement an operating system, an application program, and the like. Computer readable instructions may be loaded in memory 1104 for execution by processing unit 1102, for example. Other peripherals, such as a power supply 1108 (e.g., battery) and a camera 1110 may also be present.

Processing unit 1102 and memory 1104 work in coordinated fashion along with a transmitter 1112 and receiver 1116 to wirelessly communicates with other devices by way of a wireless communication signal. To facilitate this wireless communication, a plurality of transmit antennas 1114 are coupled to transmitter 1112, and one or more receive antennas 1118 are coupled to receiver 1116. During wireless communication, transmitter 1112 and receiver 1116 may use frequency modulation, amplitude modulation, phase modulation, and/or combinations thereof to communicate signals to another wireless device, such as a base station for example.

To provide a high degree of isolation between transmitter 1112 and receiver 1116, a local channel determination unit 1120 is configured to determine an environment of local communication channels between the transmitter 1112 and receiver 1116. In some embodiments, the local channel determination unit 1120 provides data corresponding to the environment of local communication channels to a beamforming element 1122 configured to enable beamforming functionality within the transmit antennas 1114 (e.g., by weighting the transmit antennas using analog or digital weights to introduce a phase and/or amplitude shift into the transmitted signal provided to different transmit antennas) so to attenuate the transmitted RF signal in the direction of the receive antenna(s) 1118. In other embodiments, the local channel determination unit 1120 provides data corresponding to the environment of local communication channels to a beamforming element 1122 configured to enable beamforming functionality within the receive antennas 1118 (e.g., by weighting the receive antennas using analog weights to introduce a phase and/or amplitude shift into the receives signal received at different receive antennas) so to attenuate received RF signal in the direction of the transmit antennas 1114. By attenuating transmitted and/or received RF signals between the transmit antennas 1114 and the receive antenna(s) 1118, a high degree of isolation is achieved between transmitter 1112 and receiver 1116.

To improve a user's interaction with the mobile communication device 1100, the mobile communication device 1100 may also include a number of interfaces that allow the mobile communication device 1100 to exchange information with the external environment. These interfaces may include one or more user interface(s) 1124, and one or more device interface(s) 1126, among others.

If present, user interface 1124 may include any number of user inputs 1128 that allow a user to input information into the mobile communication device 1100, and may also include any number of user outputs 1130 that allow a user to receive information from the mobile communication device 1100. In some mobile phone embodiments, the user inputs 1128 may include an audio input 1132 (e.g., a microphone) and/or a tactile input 1134 (e.g., push buttons and/or a keyboard). In some mobile phone embodiments, the user outputs 1130 may include an audio output 1136 (e.g., a speaker), a visual output 1138 (e.g., an LCD or LED screen), and/or tactile output 1140 (e.g., a vibrating buzzer), among others.

Device interface 1126 allows a device such as camera 1110 to communicate with other electronic devices. Device interface 1126 may include, but is not limited to, a modem, a Network Interface Card (NIC), an integrated network interface, a radio frequency transmitter/receiver, an infrared port, a USB connection, or other interfaces for connecting mobile communication device 1100 to other mobile communication devices. Device connection(s) 1126 may include a wired connection or a wireless connection. Device connection(s) 1126 may transmit and/or receive communication media.

Figure 12:
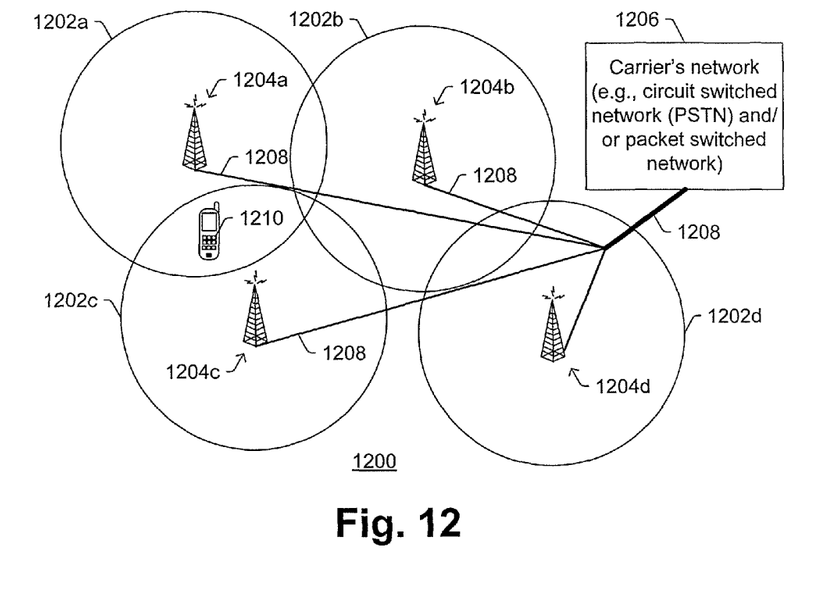
FIG. 12 illustrates an example of a wireless communication network in accordance with the disclosure.

FIG. 12 illustrates one embodiment of a wireless network 1200 over which a mobile communication device (e.g., mobile communication device 1100 in FIG. 11) in accordance with this disclosure may communicate. The wireless network 1200 is divided into a number of cells (e.g., 1202a, 1202b, . . . , 1202d), wherein each cell has one or more base stations (e.g., 1204a, 1204b, . . . , 1204d, respectively). Each base station may be coupled to a carrier's network 1206 (e.g., a packet switched network, or a circuit switched network such as the public switched telephone network (PSTN)) via one or more wirelines 1208.

A mobile device 1210 (e.g., mobile communication device 1100) or other mobile device, having a transmit antenna array configured to operate as a spatial filter that generates a null in the direction of receive antenna(s), may establish communication with the base station within that cell via one or more of frequency channels used for communication in that cell. The communication between a mobile handset or other mobile device 1210 and a corresponding base station often proceeds in accordance with an established standard communication protocol, such as LTE, GSM, CDMA or others. When a base station establishes communication with a mobile handset or other mobile device, the base station may establish communication with another external device via the carrier's network 1206, which may then route communication though the phone network.

Those skilled in the art will realize that mobile communication devices such as mobile phones may in many instances upload and download computer readable instructions from a network through the base stations. For example, a mobile handset or other mobile device 1210 accessible via network 1206 may store computer readable instructions to implement one or more embodiments provided herein. The mobile handset or other mobile device 1210 may access a network and download a part or all of the computer readable instructions for execution.

The term "computer readable media" as used herein includes computer storage media. Computer storage media includes volatile and nonvolatile, removable and non-removable media implemented in any method or technology for storage of information such as computer readable instructions or other data. Memory (e.g., 1104 in FIG. 11) is an example of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information. The term "computer readable media" may also include communication media. Communication media typically embodies computer readable instructions or other data in a "modulated data signal" such as a carrier wave or other transport component and includes any information delivery media. The term "modulated data signal" may include a signal that has one or more of its characteristics set or changed in such a manner as to encode information in the signal.

Although the disclosure has been shown and described with respect to one or more implementations, equivalent alterations and modifications will occur to others skilled in the art based upon a reading and understanding of this specification and the annexed drawings. Further, it will be appreciated that identifiers such as "first" and "second" do not imply any type of ordering or placement with respect to other elements; but rather "first" and "second" and other similar identifiers are just generic identifiers. In addition, it will be appreciated that the term "coupled" includes direct and indirect coupling. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. A transceiver system, comprising:
   a reception path comprising one or more receive antennas configured to receive a first RF signal;
   a transmission path comprising a plurality of transmit antennas configured to wirelessly transmit a second RF signal; and
   a spatial filter element configured to assign antenna weights to the transmit or receive antennas, causing the transmit or receive antennas to operate in a manner that attenuates RF signals extending between the transmit and receive antennas without attenuating the RF signals in other directions, thereby providing isolation between the transmission path and the reception path.

2. The transceiver system of claim 1, wherein the transmit antennas and the receive antennas comprise wideband antennas.

3. The transceiver system of claim 1, wherein the transmission path corresponds to a first wireless communication standard and the reception path corresponds to a second wireless communication standard.

4. The transceiver system of claim 1, wherein a number of the plurality of transmit antennas is greater than a number of the one or more receive antennas.

5. The transceiver system of claim 1, wherein the spatial filter comprises:
   a local channel determination unit configured to determine an environment of local communication channels extending between the transmission path and the reception path; and
   a beamforming element configured to receive data corresponding to the environment of the local communication channels from the local channel determination unit and based thereupon to assign receive antenna weights to the plurality of receive antennas to enable a beamforming functionality that attenuates the first RF signal along a null angle comprising the plurality of transmit antennas without attenuating the first RF signal over other angles.

6. The transceiver system of claim 1, wherein the spatial filter comprises:
   a local channel determination unit configured to determine an environment of local communication channels extending between the transmission path and the reception path; and
   a beamforming element configured to receive data corresponding to the environment of the local communication channels from the local channel determination unit and based thereupon to assign transmit antenna weights to the plurality of transmit antennas to enable a beamforming functionality that attenuates the second RF signal along a null angle comprising the one or more receive antennas without attenuating the second RF signal over other angles.

7. The transceiver system of claim 6, further comprising:
   a phase-shift splitter configured to receive the second RF signal, to generate first and second output signals having a phase shift therebetween based upon the second RF signal, and to provide the first output signal to a first transmit antenna and the second output signal to a second transmit antenna.

8. The transceiver system of claim 6, further comprising:
   an adaptive operating unit in communication with the local channel determination unit, wherein the adaptive operating unit is configured to dynamically vary the transmit antenna weights assigned to the plurality of transmit antennas based upon the environment of the local communication channels.

9. The transceiver system of claim 8, wherein the adaptive operating unit is configured to utilize an iterative algorithm that varies the transmit antenna weights until the local channel determination unit detects a minimum energy of the second RF signal over the null angle.

10. A mobile communication device, comprising:
    a reception path comprising a first number of receive antennas configured to receive a first RF signal;
    a transmission path comprising a second number of transmit antennas configured to wirelessly transmit a second RF signal, wherein the second number is greater than the first number;
    a local channel determination unit configured to determine an environment of local communication channels extending between the transmission path and the reception path; and
    a beamforming element configured to receive data corresponding to the environment of the local communication channels from the local channel determination unit and based thereupon to assign antenna weights to the first number of receive antennas or the second number of transmit antennas, so as to enable a beamforming functionality that reduces an amplitude of RF signals extending between the first number of receive antennas and the second number of transmit antennas.

11. The mobile communication device of claim 10, wherein the transmit antennas and the receive antennas comprise wideband antennas.

12. The mobile communication device of claim 10, further comprising:
an adaptive operating unit in communication with the local channel determination unit, wherein the adaptive operating unit is configured to dynamically vary the antenna weights based upon the environment of the local communication channels.

13. The mobile communication device of claim 10, wherein the antenna weights comprise transmit antenna weights assigned to the second number of transmit antennas, wherein the transmit antenna weights comprise digital baseband complex weights or analogue complex weights.

14. The mobile communication device of claim 13, wherein the analog complex weights are assigned to the transmit antennas by way of a plurality of phase shifters respectively connected to the second number of transmit antennas, or by way of transmit antennas comprising parasitic antennas attached to variable reactive loads.

15. The mobile communication device of claim 10, wherein the antenna weights comprise receive antenna weights assigned to the first number of receive antennas, wherein the receive antenna weights comprise analogue complex weights assigned by way of one or more vector modulators.

16. A method for providing isolation between a transmission path and a reception path, comprising:
operating a power supply to provide power to a transceiver system having a transmission path comprising a plurality of transmit antennas and a reception path comprising one or more receive antennas;
operating the receive antenna to receive a first RF signal; and
operating the transmit antennas or the receive antennas in a manner that reduces an amplitude of RF signals extending between the transmit and receive antennas without attenuating the RF signals in other directions, thereby providing isolation between the transmission path and the reception path,
wherein operating the transmit antennas comprises:
determining a local communication channel environment between the transmit antennas and receive antennas;
determining antenna weights based upon the local communication channel environment that reduce the amplitude of the second RF signal over the null angle; and
applying the antenna weights to the plurality of transmit antennas or the one or more receive antennas to enable a beamforming functionality.

17. The method of claim 16, further comprising:
dynamically adjusting the antenna weights in response to changes in the local communication channel environment.

18. The method of claim 16, wherein a number of the plurality of transmit antennas is greater than a number of the one or more receive antennas.

19. The method of claim 16, wherein the first RF signal corresponds to a first wireless communication standard and the second RF signal corresponds to a second wireless communication standard.

* * * * *